UNITED STATES PATENT OFFICE.

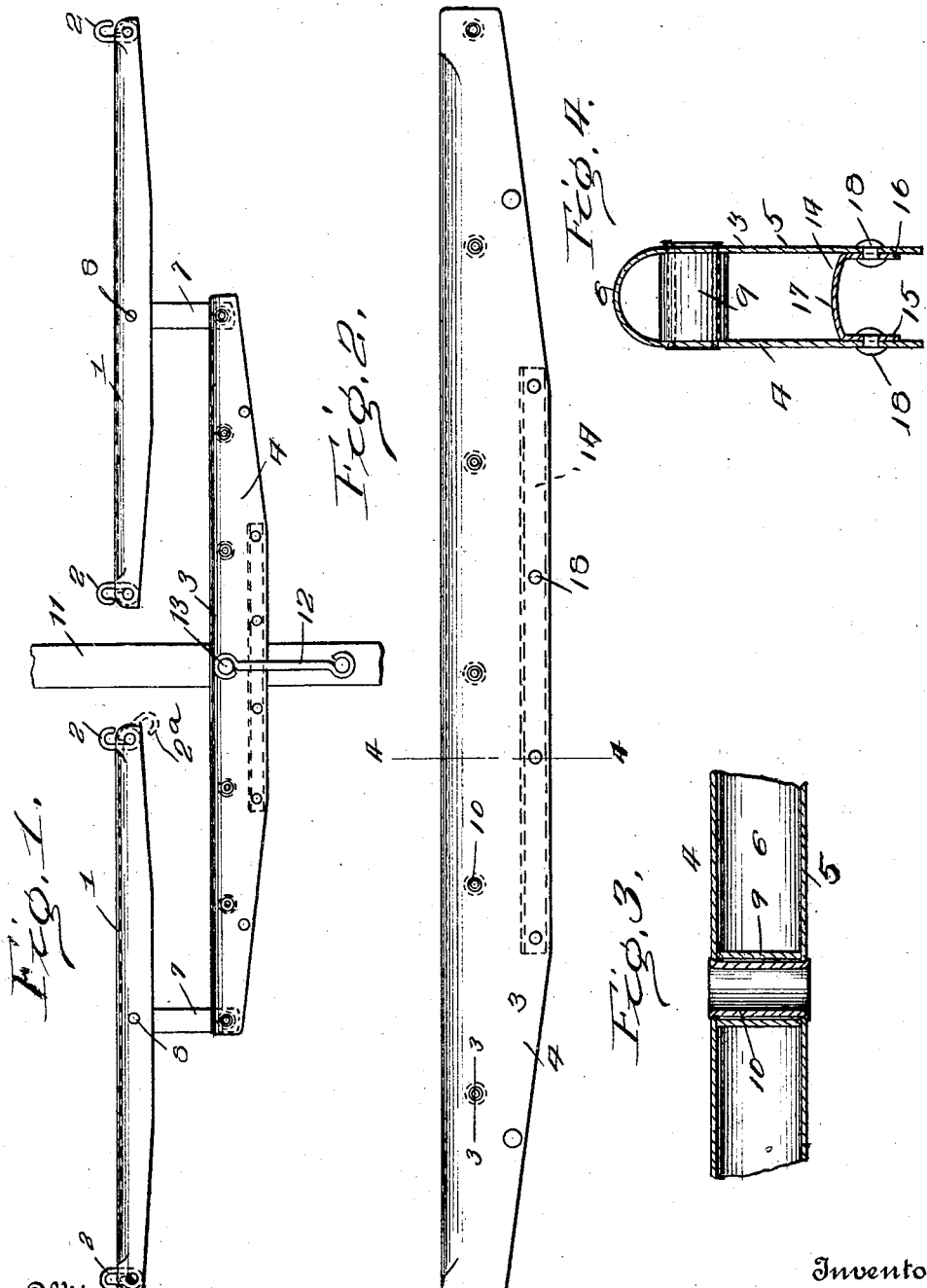

LOUIS A. PARADISE, OF MOLINE, ILLINOIS, ASSIGNOR TO DEERE & COMPANY, A CORPORATION OF ILLINOIS.

WHIFFLETREE.

1,246,777.     Specification of Letters Patent.     Patented Nov. 13, 1917.

Application filed December 10, 1909, Serial No. 532,422. Renewed April 13, 1917. Serial No. 161,902.

*To all whom it may concern:*

Be it known that I, LOUIS A. PARADISE, a citizen of the United States, residing at Moline, in the county of Rock Island and State of Illinois, have invented certain new and useful Improvements in Whiffletrees, of which the following is a specification, reference being had therein to the accompanying drawing.

This invention relates to improvements in whiffletrees or eveners and has for its object to produce a whiffletree which shall be simple in construction and at the same time strong and rigid.

Of the drawings,

Figure 1 shows a two-horse evener embodying my invention.

Fig. 2 is an enlarged view of the doubletree.

Fig. 3 is an enlarged fragmentary cross section along the line 3—3 of Fig. 2.

Fig. 4 is an enlarged cross section along the line 4—4 of Fig. 2.

Referring to the drawings, 1, 1 represents the swingletrees which are preferably formed of sheet metal doubled upon itself in such a way as to give a U-shape cross-section. The swingletrees are provided with locking hooks 2, 2 for the traces of the harness. These hooks are so shaped and so connected to the swingletrees that the traces may not be unhooked except when the hooks are swung backward into the position shown by the dotted lines at 2ª.

3 represents the doubletree which is formed of sheet metal similarly to the swingletrees 1, 1. For the sake of convenient designation, the upper part of the doubletree will be designated by 4, the lower part by 5 and the connecting part by 6.

The swingletrees are connected to the doubletrees by any preferred means, such as strap links 7, 7. These strap links are connected to the swingletrees by suitable rivets 8, 8. The ends of the connecting part 6 are cut away to give room for the strap links which are connected to the doubletree by means of the bushings 9 and 10.

The bushings 9 serve as spacers between the upper and lower parts 4 and 5 of the doubletree. Inside of each bushing 9 and extending through suitable apertures in the parts 4 and 5 is located the bushing or quill 10, which is riveted over at its ends to engage with the parts 4 and 5 to force them toward each other into firm engagement with the bushing 9.

The strap links 7, 7 are provided with apertures of approximately the same size as the outer circumference of the bushings 9 and by the engagement of the edges of the aperture with the bushing the strap links are held firmly in place.

Pairs of bushings 9 and 10 are preferably distributed throughout the length of the doubletree and serve to give reinforcement between the opposite sides. The bushings at the center serve as a means of attachment to the wagon tongue 11, as shown in the drawings. For purposes of illustration I have shown the doubletree attached to the tongue by means of the hammer strap 12 and the bolt 13 which passes through the hammer strap, one of the bushings 10 and the tongue.

At the back or open side of the doubletree, I provide throughout a part of the length a spreader or reinforcing piece 14, which is U-shaped in cross section, the opposite parallel sides being designated by 15 and 16 and the connecting part being designated by 17. The spreader 14 is preferably located entirely within the doubletree, the edges of the parts 15 and 16 lying parallel to the edges of the parts 4 and 5 but somewhat removed therefrom. The parts 15 and 16 are connected to the parts 4 and 5 respectively by means of rivets 18, 18. After specifically describing as above the particular devices selected for illustration, the following matters will be observed.

When one of these whiffletree bars is in use the strains or stresses which it meets are such that some of them tend to bend one end, or both, forward relatively to the central part; some tend to cause a collapse at the rear open edges, that is, tend to cause a bending of one rear edge toward the other, or both, and some tend to cause a collapse or bending of one plate section toward the other at points near the curved closed edge.

The hitching points of the detachable pin or bolt 13 of the hammer strap and of the draft devices at 7 are on substantially one and the same line extending longitudinally from end to end of the bar, this line being near the longitudinal lines of the curved closed edge.

And the features of the invention embodied in this whiffletree are all related to these matters. The vehicle or plow attachment being at the center imparts a strain backward, while the draft devices are at the ends and impart strains forward, and therefore the bracing separator at 17 is placed at the central part of the bar between the separated open edges of the plate sections and resists the distorting strains that tend to collapse or bend together the center parts of the rear edges. As the strain from the vehicle or plow is at the central part, it is not necessary to brace together the separated rear edges of the tapered end parts of the bar, such bracing, if given, not strengthening the bar at the points where collapsing or tearing will occur. By placing the bracing separator 17 at the central wider part of the bar only and directly at the rear edges of the plate sections, great rigidity is not only provided but the use of surplus metal is avoided and economy maintained.

But the preventing of the collapsing or bending of the central wider parts of the plate sections does not meet the tendency of these to buckle, collapse, or bend toward or from each other at points near the curved closed edge. It is not practicable to employ a single reinforcing or bracing separator along the lines near the curved edge as the plate sections are liable to lack uniformity in their shapes and relative positions near the curve. Therefore, I space and brace this part of the bar by a series of isolated devices (such as the tubular braces at 9), which, being held rigidly against the inner surfaces of the plate sections, prevent any collapsing or bending of the plates toward each other, and at the same time allow the metal of the plates immediately adjacent to the bracing separators to adjust itself to their lengths, although there may be lack of uniformity in the distances between the plates.

The parts indicated by 10 are, primarily, rivets whose heads are on the outside of the plate sections of the bar, and which act to force them together far enough to get a firm grip on the ends of the bracing separators 9 so as to insure the plate sections from springing outward, as well as insure that there shall be no rotation of the braces 9 relative to the plate surfaces; and thus an exceedingly rigid metal bar, considering it as an entirety, is produced.

I prefer to arrange the outward acting braces 9 and the inward acting rivets 10, in the way above described, that is concentric with each other; and also prefer to arrange them in a series on a common line near the lines of the curved edge so that they shall not only serve as last above described, but can also be used as bearings for pivoting the forward acting draft devices and the rearward acting pin or bolt of the hammer strap. The pivots of these fit into the riveted parts 9, which for this purpose, are made hollow or tubular. Of these pivot attaching points there are two, one at each end of the bar, and two or more intermediate of those at the ends. Consequently I can connect the bar to the vehicle or plow in such a way as to meet varying conditions of draft. As shown, the hammer strap bolt or pivot is passed through the opening at the center of the bar, which would be the correct position if the two lines of draft at the ends are equal in efficiency. But it will be seen that the bar can be released from the vehicle or plow and the strap bolts or pins can be inserted in either one of the other intermediate bearings at 9 to provide for cases where the drafts at the two ends are unequal, and, similarly, the forward acting draft devices at 7 can, either at the time of the initial assemblage of parts, or at later times, be pivotally connected to the bar either at the very ends, or one of them can be attached by means of one of the inner bearings 9, as the user sees fit.

I have described my improvements as applied to a doubletree, but it will be understood that they are equally applicable to a swingletree or to any other cross bar of a whiffletree or evener.

What I claim is—

1. The combination in a whiffletree, of a whiffletree bar formed of an integral sheet of metal doubled upon itself to provide separated parallel horizontal sections, a plurality of reinforcements extending from one bar section to the other at points between the front and rear edges of the said sections, each of the reinforcements comprising two separate concentric bushings, the outer of which engages the inner surfaces of the said sections to hold them separated, and the inner of which extends through suitable apertures in the said sections and engages the sections to tie them together, draft devices secured to two of the said reinforcements at the ends of the bar and adapted for the attachment of a draft animal, a device secured to one of the reinforcements intermediate the ends of the bar for attaching it to a vehicle, and a longitudinally extending separator for the bar sections having all of its parts positioned between them, the said separator being U-shaped in cross section and having its opposite parallel parts horizontal and connected to the opposite parallel horizontal sections of the bar near the free edges thereof.

2. A whiffletree having a main bar U-shaped in cross-section formed of a sheet of metal bent to have two substantially parallel plate sections, said bar having a wider central part and tapering end parts, an elongated bracing separator formed of sheet metal with rivet-receiving plates and arranged near, and inside of, the outer separated edges of the plate sections at the open side of the wider central part of the bar, said bracing separator being riveted to said plate sections, a series of isolated bracing separators arranged on a line between the lines of the said sheet metal separator and the lines of the curved edge of the bar, and a series of rivets engaging with the plate sections of the bar at points adjacent the said isolated bracing separators, substantially as set forth.

3. A whiffletree having a main bar U-shaped in cross section formed of sheet metal bent to provide two substantially parallel plate sections, a series of rivets on a line near the curved closed edge of the bar, a series of stationary tubular bracing separators arranged near the last said edge and held rigidly in place by the said rivets between the two parallel plate sections, and an elongated sheet metal bracing separator bent to form riveting plates and arranged near and inside of the outer edges of the plate sections at the open side of the bar and tightly riveted between said plate sections, substantially as set forth.

4. The herein described whiffletree having a main bar U-shaped in cross section formed of sheet metal bent to provide two substantially parallel plate sections, said bar having a wider central part and tapering end parts and being substantially straight at the curved closed edge, a series of rivets on a line near the last said edge to hold the plate sections from separating, a series of tubular bracing separators substantially concentric with the said rivets and bearing against the inner faces of the bar plates and held thereby rigidly in position, and an elongated sheet metal bracing separator between the bar plates at the open edges of the central wider part of the bar and riveted to the bar plates, the tapered end parts of the bar being open at the rear edges, substantially as set forth.

5. The herein described whiffletree having a main bar U-shaped in cross section formed of a metal sheet bent to provide two substantially parallel plate sections, two laterally swinging draft connecting devices, one at each end of the bar, a series of rivets on a line near the curved closed edge of the bar to hold the plate sections from separating, a series of tubular bracing separators bearing against the inner faces of the bar plates to prevent either from bending toward the other under stress applied by the said draft devices and held against rotation by the said rivets, and an elongated sheet metal separator bent to form rivet receiving plates and arranged near, and inside of, the separated edges of said plate sections, and riveted tightly between them, substantially as set forth.

6. The herein described whiffletree having a main bar U-shaped in cross section formed of sheet metal bent to provide two substantially parallel plate sections and having its curved closed edge part on substantially straight lines longitudinal of the bar, a bracing and separating device between and riveted to the plate sections, at their open edges, a series of tubular bracing separators one near each end of the bar and two or more between those at the ends of the series, said bracing separators being held rigidly against the inner faces of the plate sections, tubular rivets respectively concentric with the said tubular bracing separators and all adapted to receive similar pivot pins whereby the bar is adapted to have a draft device connected at each end at either of several tubular rivets and to be pivotally connected to the body to be drawn at either of the several intermediate tubular rivets, substantially as set forth.

In testimony whereof I affix my signature, in presence of two witnesses.

LOUIS A. PARADISE.

Witnesses:
 Roy E. Anderson,
 Wil Ireland.

Copies of this patent may be obtained for five cents each, by addressing the "Commissioner of Patents, Washington, D. C."